Aug. 27, 1940.  L. G. PYLE  2,213,148
ANGLE GAUGE
Filed July 13, 1939  2 Sheets-Sheet 2
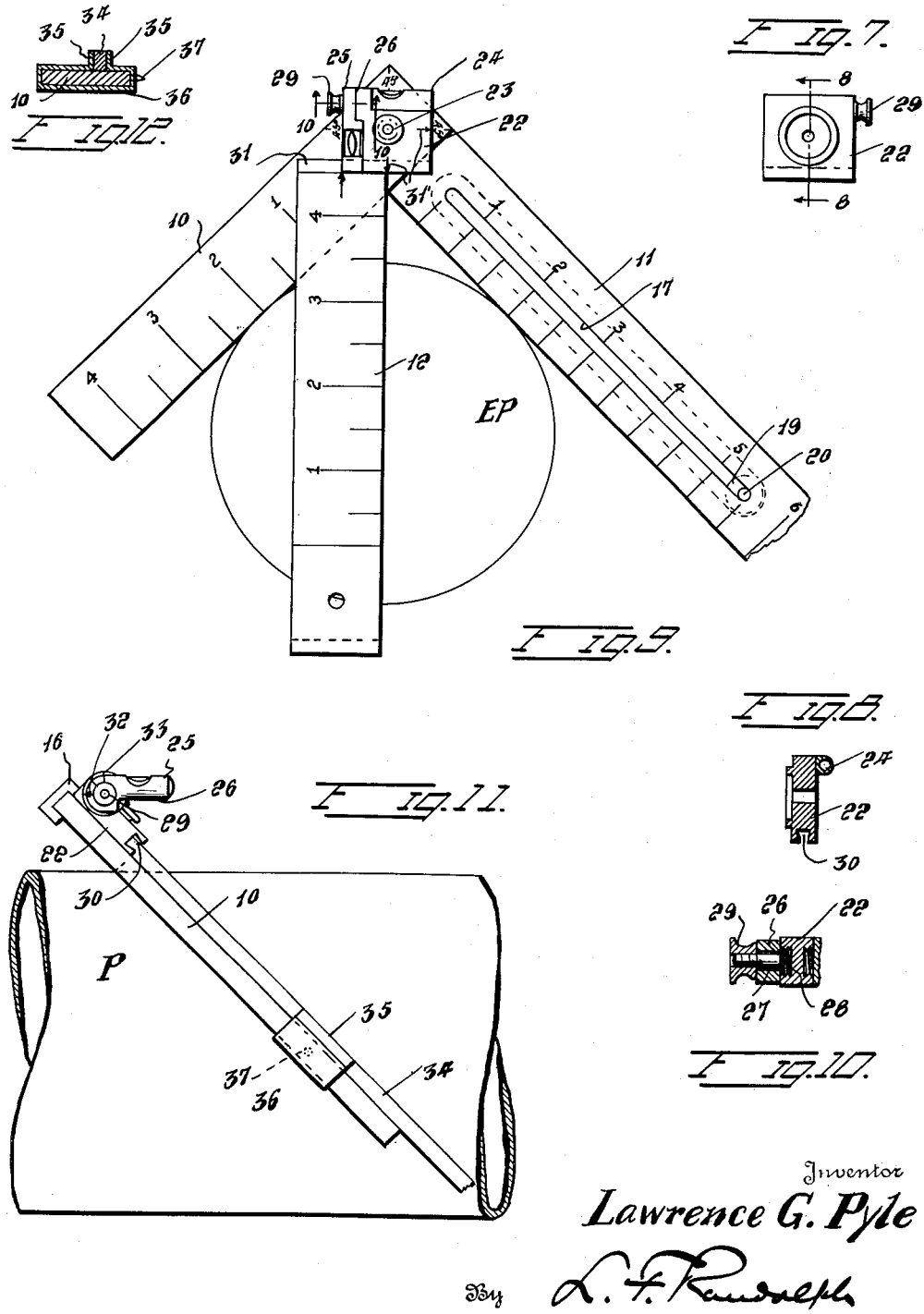
Inventor
Lawrence G. Pyle
By L. F. Randolph
Attorney Patented Aug. 27, 1940

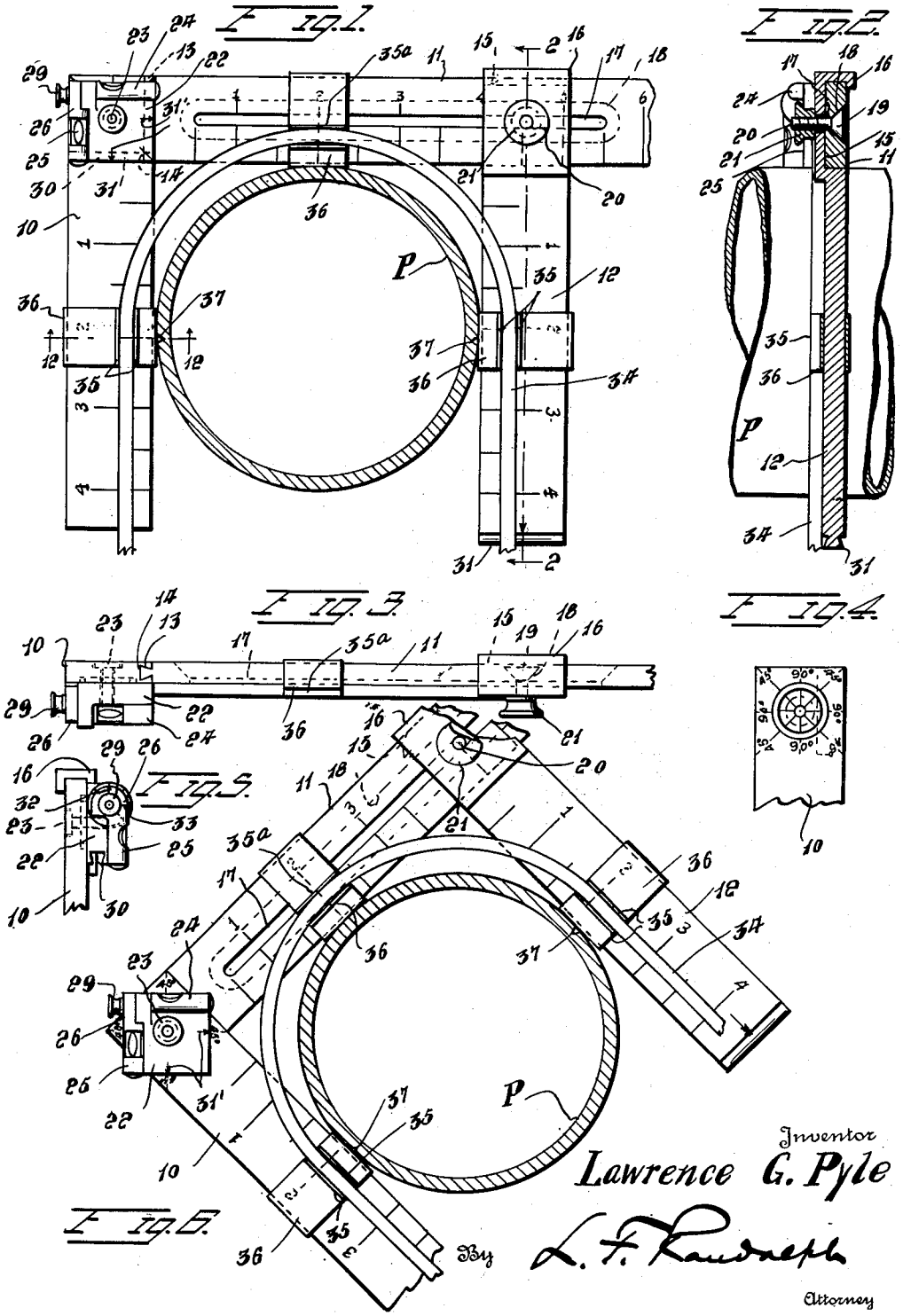

2,213,148

UNITED STATES PATENT OFFICE 2,213,148

ANGLE GAUGE

Lawrence G. Pyle, Boulder City, Nev.

Application July 13, 1939, Serial No. 284,311

5 Claims. (Cl. 33—95)

This invention relates to a gauge for use by mechanics generally but especially adapted for use in the welding industry in order to obtain practical, accurate measurements and angles especially on pipes and round objects, although useful for obtaining the same on flat and square shapes, angle iron, channel iron and other fabricated shapes, eliminating the use of flimsy templates and mathematical calculations, with a view to increasing the efficiency of the welder, at a saving in time, elimination of errors and improving the appearance of the product.

The more specific objects and advantages will become apparent from a consideration of the description following taken in connection with the accompanying drawings illustrating an operative embodiment.

In said drawings:

Figure 1 is a view showing a gauge associated with a cross section of a pipe as used to ascertain the centers for three branch lines;

Figure 2 is a sectional view taken on the plane of line 2—2 of Figure 1;

Figure 3 is a top view of the gauge of Figure 1;

Figure 4 is a fragmentary elevation of one end of the left-hand scale or blade of Figure 1;

Figure 5 is an end elevation of the upper portion at the left-hand end, of the gauge as shown in Figure 1;

Figure 6 is a view of the parts of Figure 1, adjusted for ascertaining and marking the centers at 45° to the position of Figure 1;

Figure 7 is a rear view of the leveling block;

Figure 8 is a cross section taken on the line 8—8 of Figure 7;

Figure 9 is a view of the gauge in connection with an end block for the pipe;

Figure 10 is a detailed section taken on the line 10—10 of Figure 9;

Figure 11 is a view of the gauge as used for marking a 90° cut, to accommodate an elbow, and Figure 12 is a section through a blade and clip taken on line 12—12 of Figure 1.

Referring specifically to the drawings wherein like reference characters designate like or similar parts, the tool employs three blades or scales 10, 11 and 12, each of which is preferably calibrated as shown and has straight longitudinal edges. All of said blades 10, 11 and 12 are separable. One end of blade 11 has a dove-tailed or other projection 13, conforming to an undercut recess 14 in the adjacent edge of blade 10, in which it is held friction tight, although slidable for removal and reapplication.

The blade 12 is recessed in one side as at 15 so as to slidably receive the blade 11. A hook 16 on blade 12 overhangs such blade 11. The latter blade has an elongated slot 17 which is beveled or widened at its rear face so as to accommodate the tapered head 19 of a removable screw 20 which passes through the slot 17, is adjustable to any position along such slot, and which receives a fastening nut 21 to bind against the blade 12 to secure the same rigidly in any adjusted position relative to blade 11.

A square block 22 is pivoted at 23 to the upper end of the blade 10 and it remains in its different adjusted positions by friction. Along one edge of block 22, a spirit level or the equivalent is provided at 24 while a spirit level 25 is provided on another edge of such block, at a right angle to the spirit level 24. The spirit level 25 has a casing or mounting 26 which is capable of swinging on a pivot stud screwed or otherwise fastened at 28 in the block 23 with its axis in a plane at a right angle to the axis of pivot 23. Such spirit level 25 or casing 26 is adapted to be secured sufficiently tight in adjusted or angular position by means of a nut 29 screwed to the post or pivot 27 as shown in Figure 10.

It will be noted that another edge of the block 22 has an undercut recess or groove 30 therein. The previously mentioned blade 12 is adapted to be removed and at one end it has a projection or rib 31 conforming in cross sectional shape to the groove 30, and applicable friction tight therein as suggested in Figure 9, although in some positions, it will completely fill the groove 30, and blades 10 and 11 be aligned, so as to form a T-square.

Each of the blades or scales 10, 11 and 12 may be magnetized to assist in holding the instrument against the pipe when scribing an angle.

In order to render it less difficult to hold and mark larger size pipe, I employ a generally U-shaped wire 34, preferably metallic and of any desired degree of flexibility and square or rectangular in cross section. Such wire 34 is detachably held between jaws 35 constituting upstanding terminals of flexible metallic clips 36 slidable along the blades and detachable therefrom, being frictionally engaged with the blades so as to remain in any adjusted position thereon. The jaws on the clip 36 for blade 11 are preferably arcuate to conform to the curvature of the wire 34, the flexibility of the latter enabling it to conform to the particular pipe and position of the clips with respect thereto.

Clips 36 for the blades 10 and 12, preferably have spurs 37 at the sides thereof to occupy center punch marks or depressions in the pipe P as shown in Figures 1 and 6.

The device may be used as in Figure 1 in connection with any suitable work, for instance a round pipe P, all blades being adjusted to contact the same. If one, two or three pipes are to be welded or otherwise connected to pipe P as branches, the centers for the connections may be readily ascertained by the use of the blades or scales, with center punch marks being made and the pipe subsequently cut and the branches fitted as is common in the welding art.

In instances where the same centers as mentioned in Figure 1 are to be ascertained, the gauge is used as shown in Figure 6, the centers in this instance to be at 45° to the centers in Figure 1. In such use, the block 22 will be adjusted to a position 45° to that of Figure 1 and in this connection, it will be noted that the blade 10 adjacent the block 22 has calibrations as indicated in Figure 4 to cooperate with center marks or arrows 31'. The spirit levels will coact to show when the gauge is in the correct position.

In Figure 9, the tool is shown as used to mark the center of a reducing fitting or end plug EP for the pipe P, for example. In this instance, the blade 12 is sufficiently positioned by rib 31 in groove 30 so as to align at one longitudinal edge with the axis 23 and one of the arrows 31', thus extending diametrically at one edge across the part EP and enabling the center to be ascertained.

The movable spirit level 25 is advantageous especially where an elbow is to be fitted to a pipe at 90°, as suggested in Figure 11. The pipe P is adapted to be marked and cut off along one plane of the blade 10 which is at 45° to the spirit level 25, such spirit level or its casing 26 having an arrow or indication 32 adapted to register with calibrations 33 on the adjacent surface or end of the block 22.

Various changes may be resorted to provided they fall within the spirit and scope of the invention.

I claim as my invention:

1. A gauge of the class described having blades at an angle to each other, a block pivoted to said blades at the junction thereof, said block having an undercut groove for attachment of another blade thereto, level means connected to the block adjustable to different angles in a plane parallel to the plane of the blades, another level carried by the block at a right angle to the first mentioned level, and a detachable blade on one of the first mentioned blades having a rib to detachably fit said undercut groove.

2. A gauge of the class described having first and second blades, a third blade, said first and second blades being in parallelism and each having an end connected to and adjacent the opposite ends of the third mentioned blade at right angles to each said first and second mentioned blades, a clip slidable on each blade, and a generally U-shaped member positioned by the clips.

3. A gauge of the class described having first and second blades, a third blade, said first and second blades being in parallelism and each having an end connected to and adjacent the opposite ends of the third mentioned blade at right angles to each said first and second mentioned blades, a clip slidable on each blade, a generally U-shaped member positioned by the clips, certain of said clips having spurs to engage center punch depressions.

4. A gauge of the class described having first and second blades, a third blade, said first and second blades being in parallelism and each having an end connected to and adjacent the opposite ends of the third mentioned blade at right angles to each said first and second mentioned blades, a clip slidable on each blade, a generally U-shaped member positioned by the clips, said clips comprising strips of metal frictionally engaging the blades and terminating in jaws providing spaces removably entered by the U-shaped member.

5. A gauge of the class described having first and second blades, a third blade, said first and second blades being in parallelism and each having an end connected to and adjacent the opposite ends of the third mentioned blade at right angles to each said first and second mentioned blades, a clip slidable on each blade, a generally U-shaped member positioned by the clips, the third mentioned blade having a longitudinal elongated slot, and one of said connections being an adjustable element passing through said slot.

LAWRENCE G. PYLE.